No. 607,621. Patented July 19, 1898.
B. G. LAMME.
SYSTEM OF ELECTRICAL DISTRIBUTION.
(Application filed Dec. 16, 1897.)
(No Model.)

WITNESSES:
Ethan G. Dodds
H. C. Tener

INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA.

SYSTEM OF ELECTRICAL DISTRIBUTION.

SPECIFICATION forming part of Letters Patent No. 607,621, dated July 19, 1898.

Original application filed January 28, 1897, Serial No. 621,117. Divided and this application filed December 16, 1897. Serial No. 662,217. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Systems of Electrical Distribution, (Case No. 764,) of which the following is a specification, this application being a division of my application filed January 28, 1897, Serial No. 621,117.

My invention relates to systems of electrical distribution involving means for converting alternating into direct currents; and it has for one of its objects to provide a method and a means whereby a three-wire direct-current system may be supplied with energy from an alternating-current supply-circuit at a minimum expense and loss of energy and with a maximum degree of efficiency.

A further object of the invention is to provide means whereby a plurality of different voltages may be secured in connection with an alternating-current circuit and a rotary transformer.

Figure 1:
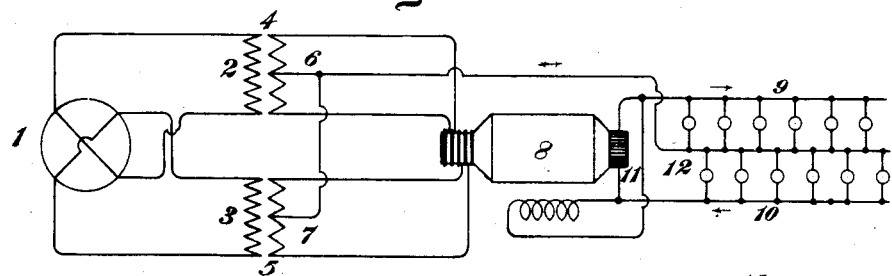
Figure 2:
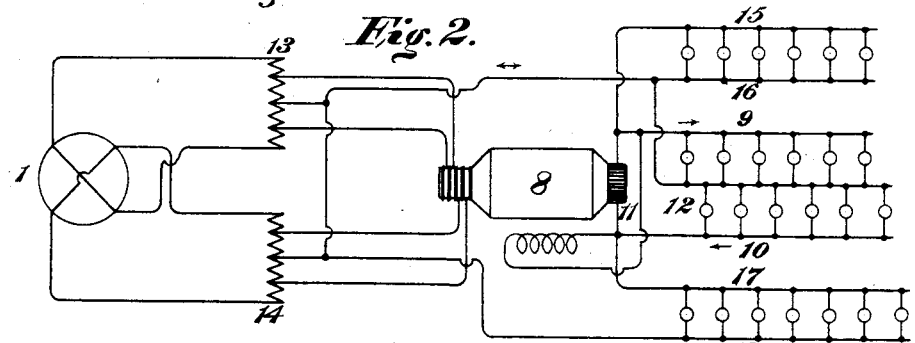
Figure 3:
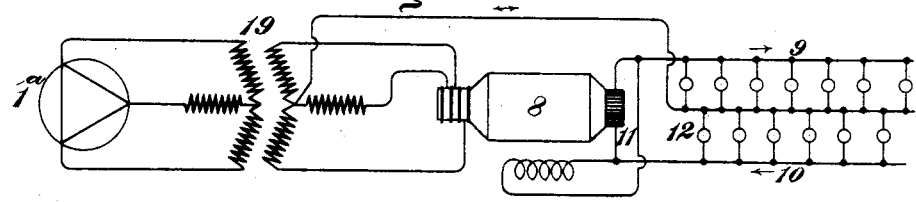
Figure 4:
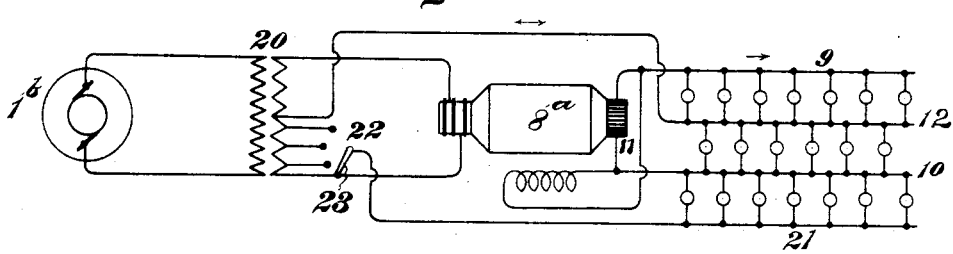

Reference being had to the accompanying drawings, Figure 1 is a diagram illustrating my invention as adapted for supplying a three-wire direct-current circuit from a two-phase alternating-current system of distribution. Fig. 2 is a similar view showing a different form of stationary transformer and additional direct-current circuits. Fig. 3 is a diagram illustrating the invention in connection with a three-phase alternating-current system. Fig. 4 is a diagram illustrating an additional feature of my invention in connection with a single-phase alternating-current system.

In Fig. 1 I have shown a system for utilizing two-phase alternating currents in connection with a direct-current work-circuit embodying a neutral or compensating third conductor. This form of work-circuit, in which the translating devices are arranged in two sets or series, each of which are connected in multiple between one of the main conductors and the neutral or compensating conductor, is well known in the art; but heretofore it has been usual to employ two direct-current generators in connection with such a system in order to secure the desired results.

With this form of my invention I employ a two-phase generator 1, with the two circuits of which are respectively connected the primary windings 2 and 3 of stationary transformers 4 and 5. The terminals of the secondaries 6 and 7 of these transformers are connected to corresponding collector-rings of the rotary transformer 8. The outer or main conductors 9 and 10 of the direct-current circuit are supplied with current from the commutator 11 of the said rotary transformer. A third conductor 12 extends between the conductors 9 and 10, and the translating devices are arranged in two sets or groups, one set or group being connected between the conductors 9 and 12 and the other set between the conductors 10 and 12. In case the two sets of translating devices are equal in number and kind there will be no unbalancing of the circuit and transfer of energy, as is well understood. In order to provide, however, for the transfer of energy in one direction or the other, according to which side of the circuit is overloaded with reference to the other, I connect the middle conductor 12 to the middle point of the winding of each of the secondaries 6 and 7 of the transformers 4 and 5. When the middle conductor is so connected, the potential between it and each of the main conductors 9 and 10 is one-half that between the two conductors 9 and 10, and if there is an unbalancing of the loads energy will be transferred to or from the middle points of the secondaries 6 and 7, as the case may be, in the same manner as in the systems heretofore in use, in which the balancing-conductor is connected between two direct-current generators employed for supplying the work-circuit with energy.

If the conductor 12 is connected to the middle points of the secondaries 6 and 7, the currents which flow in it are always direct currents. Although an alternating current flows in each of the transformer secondary coils, a reversal takes place at its ends once in each alternation. The direct current flowing in conductor 12 is therefore a true alternating current in the transformer-coil, the coil being reversed with reference to the current rather than the current with reference to the coil. The coil thus acts as an autotransformer and not as a choke-coil in supplying equal electromotive force to the two branches of the direct-current circuit.

In Fig. 2 I have shown a system in which the two-phase alternating-current generator 1 supplies energy to two autoconverters 13 and 14, the leads to the collecting-rings of the rotary transformer 8 being taken from such points in the single winding of these converters as to reduce the applied electromotive force the desired amount. In this case, as in the one above described, the direct current is supplied from the commutator 11 of the rotary transformer to the outer conductors 9 and 10 of the direct-current work-circuit, and the neutral or balancing conductor 12 is connected to the middle points of the windings 13 and 14. If the electromotive force supplied by the generator 1 is suitable for application directly to the rotary transformer, the secondary leads may also be connected to the terminals of the coils 13 and 14, in which case the transfer of energy will be effected to and from the middle points of these coils in the same manner as above described, but there will be no reduction of voltage between the generator 1 and the rotary transformer 8. In Fig. 2 I have also shown two additional direct-current work-circuits 15 16 and 17 18, the conductors of each of which are connected, respectively, to one of the direct-current terminals of the rotary transformer and to the middle points of the windings of the stationary transformers 13 and 14. With this arrangement I am enabled to utilize direct current for any desired purpose, the potential between the conductors 15 and 16 and between the conductors 17 and 18 being one-half that across the brushes of the commutator 11 and equal to that between the conductors 10 and 12. Either or both of these work-circuits 15 16 and 17 18 may be employed in connection with the circuits 10 and 12 or by themselves.

In Fig. 3 I have shown the system illustrated in Fig. 1, except that a three-phase generator 1ª and a three-phase transformer 19 are employed in lieu of the two-phase generator and the two-phase transformers shown in Fig. 1. With the arrangement shown, in which the star-winding of transformers is employed, if the neutral or compensating wire 12 is connected to the middle point of the secondary, as indicated, the results above described will be secured.

In Fig. 4 I have shown a single-phase generator 1ᵇ and a single transformer 20, the rotary transformer 8ª in this case being supplied with single-phase current from the secondary of the transformer 20. The conductors 9, 10, and 12 of the direct-current circuit are arranged to operate in the same manner as the corresponding conductors in the systems before described.

The direct-current circuits thus far described are suitable for both light and power purposes. In order to secure a uniform and equal potential between the conductors 9 and 12 and 10 and 12 and the transmission to and from the stationary-transformer secondary of direct currents, it is necessary that the neutral conductor be connected to the middle point of such secondary, as has been above described. If, however, it is desired to secure in connection with either or both of the conductors 9 and 10 an electromotive force suitable for the operation of lights, it may be done by means of a conductor 21, which is connected to any point in the secondary of the stationary transfomer. I have shown the secondary of the transformer 20 as provided with loops leading to contact-points 22, with the latter of which a movable switch-arm 23 engages. With the switch-arm 23 in the position shown the potential between the conductors 10 and 21 will be substantially seven-tenths of that between the conductors 9 and 10, but the current transmitted will be alternating or fluctuating and therefore not suitable for other purpose than for electric lighting. By moving the switch-arm 23, so as to connect the conductor 21 with other points in the secondary of the transformer 20, other voltages between seven-tenths and one-half of the voltage across the terminals of the rotary transformer may be secured.

I desire it to be understood that the details of my invention may be varied from what is shown and described without departing from its spirit and scope.

I claim as my invention—

1. In a system of electrical distribution, the combination with a source of alternating current, transmitting-conductors connected therewith, a stationary transformer, a rotary transformer connected to the stationary transformer, two distributing-conductors connected to the direct-current terminals of the rotary transformer, and a balancing-conductor forming the third wire of a three-wire system and connected to an intermediate point of the stationary-transformer winding.

2. In a system of electrical distribution, the combination with a source of alternating currents of relatively-displaced phases, of transformers connected thereto, a rotary transformer connected to the stationary transformers, two direct-current conductors connected to the direct-current terminals of the rotary transformer and balancing-conductors forming with the direct-current conductors a multiple-wire system, said balancing-conductors being each connected to corresponding intermediate points in the windings of the stationary transformers.

3. In a system of electrical distribution, the combination with a source of alternating currents of relatively-displaced phases, of transformers connected thereto, a rotary transformer connected to the stationary transformers, two direct-current conductors connected to the direct-current terminals of the rotary transformer, and a balancing-conductor forming with the two direct-current conductors a three-wire system, which conductor is connected to intermediate points of relatively equal potential in the stationary-transformer windings.

4. In a system of electrical distribution, the combination of a source of alternating currents, transmitting-conductors therefor, stationary transformers, rotary transformers connected therewith, distributing-circuits for direct current consisting of two conductors between which exists the full potential of the direct-current terminals of the rotary transformer, and balancing-conductors connected to the stationary transformers and having a potential midway between that of the distributing-conductors.

5. In a system of electrical distribution, the combination with stationary transformers connected to a source of two-phase alternating currents, of secondary conductors connected to said transformers, those in each phase between which the greatest difference of potential exists being led to a rotary transformer, while another connected to the middle points of the secondary windings of all the transformers serves as the balancing-wire for a three-wire distributing system supplied with a direct current from the rotary transformer.

6. In a system of electrical distribution, the combination with two groups of translating devices, connected in series across constant-potential mains, of a third wire connecting the intermediate points of the several series, a rotary transformer connected to the constant-potential direct-current mains, a stationary transformer connected to a source of alternating current, and also to a rotary transformer, said stationary transformer having the middle point of its secondary winding connected to the third wire of the translating devices, as set forth.

7. In a system of electrical distribution, the combination of two groups of parallel connected translating devices, said groups connected in series, two main distributing-conductors connected to said groups, a rotary transformer having its direct-current terminals connected to the two main distributing-conductors, stationary alternating-current transformers connected to the rotary transformer, a source of alternating currents of relatively-displaced phases connected to said stationary transformers, and a connection from the middle points of the secondaries of said transformers to a third or balancing conductor connecting the intermediate points of said series of translating devices, as set forth.

8. The method of distributing electrical energy which consists in generating an alternating current, transmitting the same to a stationary transformer, causing the stationary transformer to actuate a rotary transformer, supplying a direct current derived from the alternating current supplied to the rotary transformer to the outside wires of a multiple-wire distributing system, actuating therefrom groups of parallel connected devices in series, and compensating for unbalanced distribution of said devices by maintaining the intermediate terminals of the respective groups at the potentials of intermediate points of the stationary-transformer windings, as set forth.

9. The method of distributing electrical energy which consists in generating an alternating current, transmitting the same, transforming the same by a stationary transformer, feeding a multiple-wire distributing-circuit with direct current by causing a further transformation of the alternating into a direct current, and establishing a sensibly-constant potential between the pairs of conductors of the multiple-wire circuit, irrespective of the distribution of translating devices, by establishing upon the intermediate wire of the distribution system the potential of an intermediate point in the stationary-transformer winding, as set forth.

10. The method of supplying three-wire direct-current systems of distribution with energy from alternating-current transformers which consists in transforming the alternating currents into direct currents for the main direct-current conductors and effecting the transfer of energy necessitated by inequality in loads to and from the middle point of the secondary of the alternating-current transformer.

11. The method of supplying a "three-wire" direct-current system of distribution with energy from an alternating-current transformer which consists in transforming the alternating current into direct current for the main direct-current conductors and transferring energy to and from the middle point of the secondary of the alternating-current transformer.

12. A system of distribution comprising a source of alternating current, an alternating-current transformer, a rotary transformer receiving energy from the secondary of said alternating-current transformer, a direct-current circuit supplied by said rotary transformer and comprising a neutral conductor connected to substantially the middle point of the alternating-current-transformer secondary and an additional working conductor, connected to another point in said secondary.

13. A system of distribution comprising a source of alternating currents, an alternating-current transformer supplied thereby, a rotary transformer supplied from the secondary of said transformer, two working conductors extending from the commutator-brushes of the rotary transformer and a third working conductor extending from a point in the secondary of the alternating-current transformer.

14. A system of distribution comprising a source of alternating current, a rotary transformer, a direct-current circuit supplied thereby and comprising a neutral or compensating conductor, and a stationary transformer interposed between the source of alternating current and the rotary transformer, to the middle point of the winding of which said neutral or compensating conductor is connected.

15. A system of distribution comprising a source of alternating currents, a rotary transformer supplied from said source, a direct-current circuit supplied by said rotary transformer and comprising a neutral or compensating conductor, and a transformer having a winding connected across the alternating-current circuit, to the middle point of which the neutral or compensating conductor is connected.

16. A system of electrical distribution comprising a source of alternating currents, a stationary transformer supplied thereby, a rotary transformer supplied from said stationary transformer and a direct-current circuit the conductors of which are respectively connected to one of the rotary transformer direct-current terminals and the middle point of the secondary winding of the stationary transformer.

17. A system of electrical distribution comprising a source of alternating currents, a rotary transformer, a stationary transformer interposed between said source and the alternating-current end of the rotary transformer, and a plurality of direct-current circuits the conductors of each of which are respectively connected to the direct-current terminals of the rotary transformer and to the middle point of the secondary winding of the stationary transformer.

In testimony whereof I have hereunto subscribed my name this 8th day of December, A. D. 1897.

BENJ. G. LAMME.

Witnesses:
 JAMES B. YOUNG,
 H. C. TENER.

Correction in Letters Patent No. 607,621.

It is hereby certified that Letters Patent No. 607,621, granted July 19, 1898, upon the application of Benjamin G. Lamme, of Pittsburg, Pennsylvania, for an improvement in "Systems of Electrical Distribution," were erroneously issued to said Lamme as sole owner of the invention; whereas said Letters Patent should have been issued to *the Westinghouse Electric and Manufacturing Company, of same place,* said Westinghouse Electric and Manufacturing Company being assignee of the entire interest in said invention, as shown by the assignment of record in this Office; and that the said Letters Patent should be read with this correction therein that the same may conform to the record of the case in the Patent Office.

Signed, countersigned, and sealed this 16th day of August, A. D., 1898.

[SEAL.]

WEBSTER DAVIS,
*Assistant Secretary of the Interior.*

Countersigned:
   A. P. GREELEY,
      *Acting Commissioner of Patents.*